United States Patent [19]
Jardine et al.

[11] Patent Number: 6,009,669
[45] Date of Patent: Jan. 4, 2000

[54] SHAPE MEMORY WIRE ACTUATED AIRCRAFT DOOR SEAL

[75] Inventors: Andrew Peter Jardine, Thousand Oaks; Heinrich Gerhardt; Arun Robert Palusamy, both of Torrance; Raymond David Gomez, La Habra, all of Calif.

[73] Assignee: Northrop Grumman Corporation, Los Angeles, Calif.

[21] Appl. No.: 09/268,510

[22] Filed: Mar. 11, 1999

[51] Int. Cl.[7] ...................................................... E06B 7/28
[52] U.S. Cl. ................................ 49/316; 49/306; 49/318; 49/490.1
[58] Field of Search .............................. 49/309, 303, 306, 49/310, 312, 316, 417, 318, 319, 490.1

[56] References Cited

U.S. PATENT DOCUMENTS

| | | | |
|---|---|---|---|
| 566,168 | 8/1896 | Grove | 49/316 |
| 1,948,108 | 2/1934 | Goellner | 49/307 |
| 3,034,826 | 5/1962 | Garvey et al. | 49/319 |
| 3,111,981 | 11/1963 | Simbulan | 49/309 |
| 3,199,155 | 8/1965 | Coleman | 49/309 |
| 3,252,255 | 5/1966 | Marpe | 49/318 |
| 5,804,276 | 9/1998 | Jacobs et al. | 428/110 |
| 5,869,389 | 6/1999 | Jacobsen et al. | 251/129.06 |

FOREIGN PATENT DOCUMENTS 2697049  4/1994  France .
7250421  6/1994  Japan .

*Primary Examiner*—Daniel P. Stodola
*Assistant Examiner*—Curtis A. Cohen
*Attorney, Agent, or Firm*—Terry J. Anderson; Karl J. Hoch, Jr.

[57] ABSTRACT

An aircraft door adapted to substantially seal with a door frame. The aircraft door is provided with an edge portion which is formed to engage the door frame. The edge portion has a sealed position wherein the edge portion is engaged with the door frame. The edge portion further has an unsealed position wherein the edge portion is spaced from the door frame. The aircraft door is further provided with a substantially rigid door body and an elastic portion interposed between the door body and the edge portion. The elastic portion is selectively expandable and compressible for permitting movement of the edge portion between the sealed and unsealed positions. The aircraft door is further provided with an actuator device which mechanically couples the door body with the edge portion for selectively moving the edge portion between the sealed and unsealed positions. The actuator device comprises a shape memory metal material having a predetermined transition temperature. The actuator device assumes a contracted state when above the transition temperature and the edge portion is sized and configured to be in the unsealed position. The actuator device assumes an expanded state when below the transition temperature and the edge portion is sized and configured to be in the sealed position.

37 Claims, 3 Drawing Sheets

SHAPE MEMORY WIRE ACTUATED AIRCRAFT DOOR SEAL

FIELD OF THE INVENTION

The present invention relates generally to aircraft doors, and more particularly to a door which engages a door frame in response to expansion of an actuator device formed of a shape memory metal.

BACKGROUND OF THE INVENTION

Aircraft employ a wide variety of doors which are exposed to the surrounding environment about the aircraft. Passenger ingress and egress doors and storage compartment doors permit access to the interior of the aircraft and are typically opened and closed while the aircraft is on the ground. In addition, there is a variety of flight actuated doors which are opened and closed during various times during aircraft flight. Common examples of flight actuated doors are weapons bay doors (in military aircraft), sensor suite doors, landing gear doors and auxiliary air doors.

Aircraft are subjected to various external and internal loads which may result in temporary deformations of the door frames which are located at various places about the aircraft. For example, it is typical for an aircraft to store fuel within its wings. Thus, when the aircraft is fueled the wings may tend to droop and the bottom side of the fuselage to be in a compressive state. When the aircraft is in flight, a variety of aerodynamic forces may act to upwardly push the wings and cause the bottom side of the fuselage to be in a relative tension state. Where there are doors located at regions of the aircraft which are locally subject to such forces (e.g., landing gear doors and weapons bay doors) the door frames thereof may deform, both in the plane of the door frame and out of the plane of the door frame.

Such deformations may result in the formation of gaps or discontinuities between the door and the door frame. As such, the reduction or mitigation of any gaps or discontinuities at or around the door frame is especially desirable because they tend to increase the radar signature of the aircraft.

In addition, it is often desirable that aircraft doors must be able to withstand pressure differentials between the interior and exterior of the door. Typically the interior pressure is greater than the external pressure (i.e., burst pressure). Such a pressure may be a function of the placement of the door upon the aircraft, altitude, and relative aircraft speed. A positive cabin pressure is typically maintained to provide for a hospitable environment. The door frame deformations, however, may result may result in poor or improper sealed engagement between the door and the door frame.

Though conventional aircraft doors are provided with seals about the perimeter of the door, such seals possess certain deficiencies which detract from their overall utility. In this respect, the prior art seals are typically designed to be highly flexible to allow for extreme deformations of the associated door frame. However, because of this high degree of flexibility, such seals are susceptible to poor sealing engagement with the door frame and are therefore inadequate to mitigate gaps and discontinuities when subjected to pressure differentials between the interior and exterior of the aircraft.

Accordingly, there is a need in the art for an aircraft door which is capable of substantially maintaining contact with a door frame which is susceptible to deformation in order to reduce or mitigate a perimeter gap occurring between the door and the door frame.

SUMMARY OF THE INVENTION

In accordance with the present invention, there is provided an aircraft door adapted to substantially seal with a door frame. The aircraft door is provided with an edge portion which is formed to engage the door frame. The edge portion has a sealed position wherein the edge portion is engaged with the door frame. The edge portion further has an unsealed position wherein the edge portion is spaced from the door frame. The aircraft door is further provided with a substantially rigid door body and an elastic portion interposed between the door body and the edge portion. The elastic portion is selectively expandable and compressible for permitting movement of the edge portion between the sealed and unsealed positions. The aircraft door is further provided with an actuator device which mechanically couples the door body with the edge portion for selectively moving the edge portion between the sealed and unsealed positions. The actuator device comprises a shape memory metal material having a predetermined transition temperature. The actuator device assumes a contracted state when above the transition temperature and the edge portion is sized and configured to be in the unsealed position. The actuator device assumes an expanded state when below the transition temperature and the edge portion is sized and configured to be in the sealed position.

In the preferred embodiment of the present invention, the actuator device comprises a plurality of shape memory metal wires. The shape memory wires are arrayed to collectively impart movement to the edge portion. A heat source, preferably a thermal strip, is provided in thermal communication with the shape memory metal wires for selectively heating the shape memory wire above and below the transition temperature. Each of the shape memory wires has first and second ends thereof which are connected to the thermal strip. In addition, each of the shape memory wires has a wire body interposed between the first and second ends and the wire body being looped about the edge portion of the aircraft door.

The aircraft door constructed in accordance with the present invention presents numerous advantages not found in the related prior art. In this respect, the present invention is particularly adapted to reduce a perimeter gap between the door and door frame. In particular the shape memory actuator device is adapted to selectively expand and to effect sealed engagement with the door frame. It is contemplated that gaps, voids, or contour discontinuities occurring between the aircraft door and the door frame are especially undesirable because they tend to increase the radar signature, and therefore the observableness of the associated aircraft. As such, the present invention functions to reduce or mitigate the radar signature of the associated aircraft.

Some prior art active door seal arrangements are dependent on pneumatic or hydraulic pumps which inflate expandable bladders or seals. Other door seal arrangements are activated in response to electric motors or solenoid devices. Such prior art actuation devices have their attendant undesirable weight, space and maintenance requirements. Advantageously, a shape memory material, preferably in metal wire form, is incorporated into the actuator device of the aircraft door of the present invention. Because the actuator device is temperature sensitive, the actuator device is responsive to exposure to a heat source. Such heat source may take the form of a simple thermal strip which is relatively light and compact. Significantly, because the shape memory material directly imparts motive force to the door edge portion, the need is avoided for an additional mechanical linkage with an attendant plurality of parts which are subject wear, breakage and maintenance. Thus, the shape memory actuator device is relatively simple and avoids the complexities of assembly and maintenance associated with other contemporary actuation devices. In addition, because the aircraft door of the present invention avoids complex linkages associated with seals of the prior art doors, the present aircraft door may be readily retrofitted into existing door frames without the need for substantial aircraft modification.

As such, the aircraft door constructed in accordance with the present invention represents a significant advancement in the art.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENTS

Figure 1:
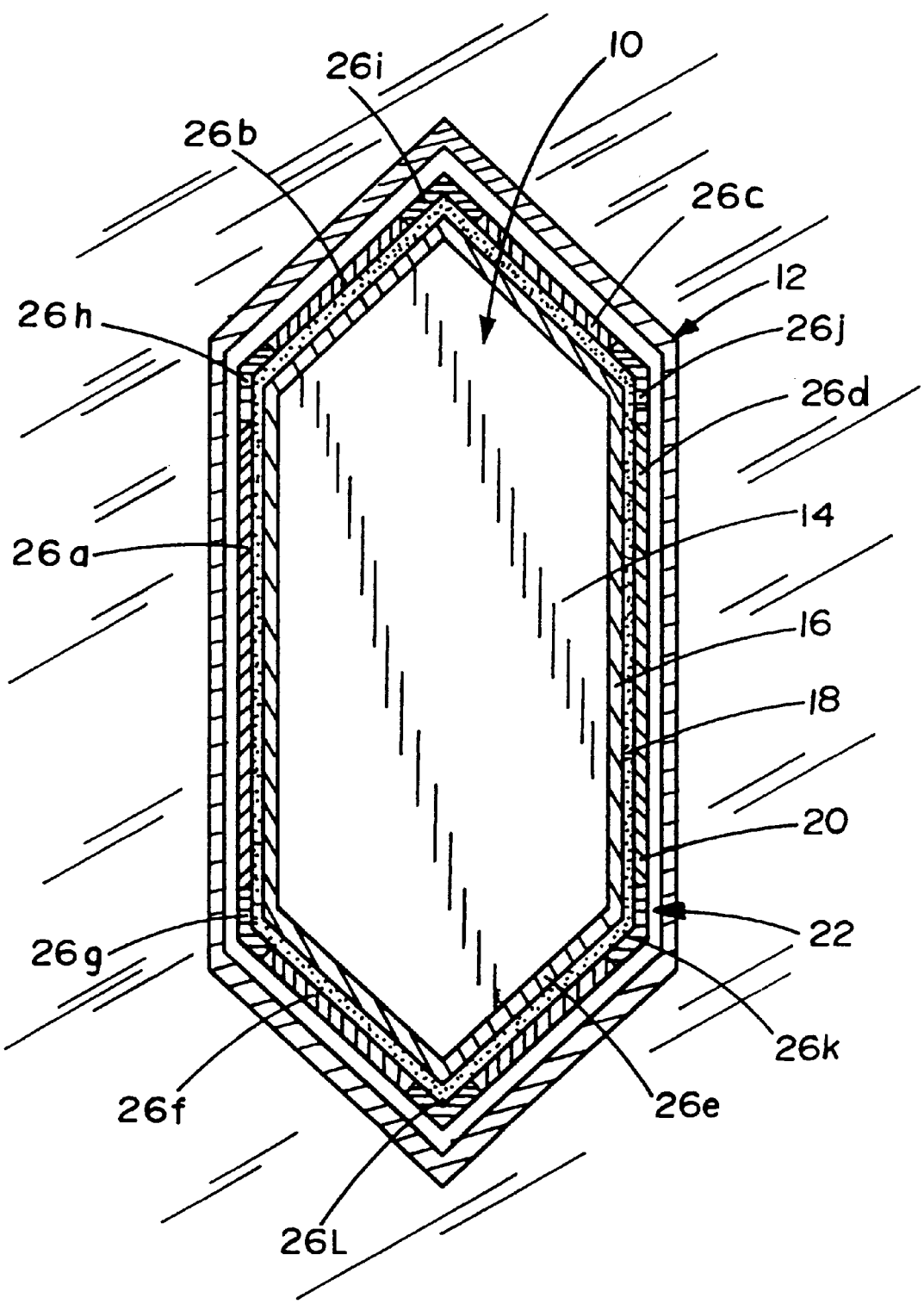
FIG. 1 is a front view of the aircraft door of the present invention depicted with an aircraft door frame and in an unsealed relationship therewith.
Figure 2:
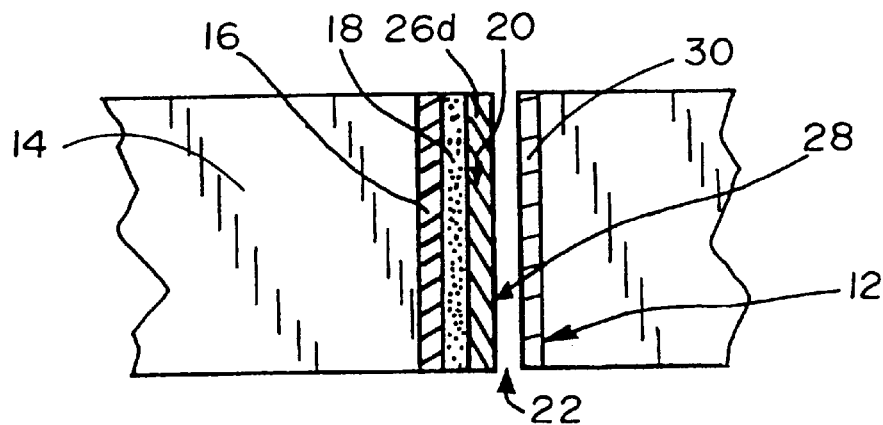
FIG. 2 is an enlarged view of a section of the aircraft door illustrated in FIG. 1.
Figure 3:
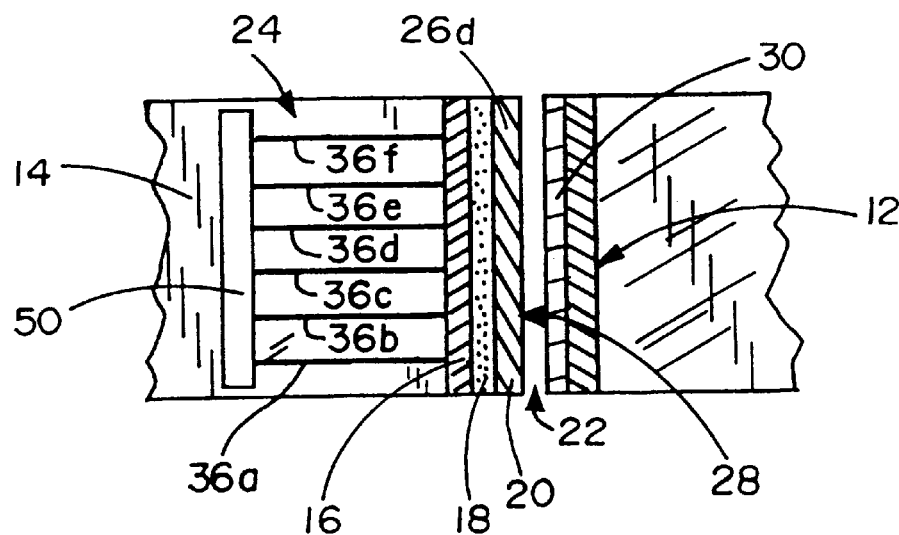
FIG. 3 is a back view of the section of the aircraft door illustrated in FIG. 2.
Figure 4:
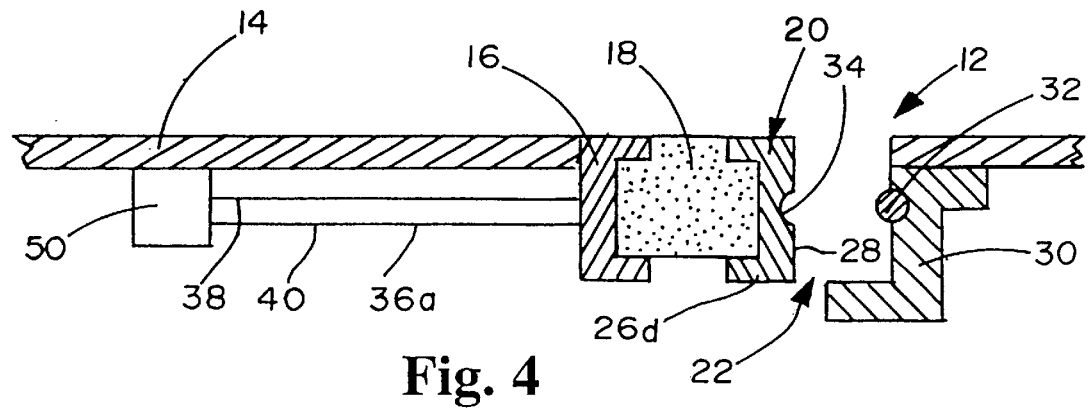
FIG. 4 is an enlarged cross-sectional view of the section of the aircraft door illustrated in FIG. 2.

Referring now to the drawings wherein the showings are for purposes of illustrating preferred embodiments of the present invention only, and not for purposes of limiting the same, FIGS. 1–6 illustrate a deformable aircraft door 10 constructed in accordance with the present invention. As will be described in more detail below, the aircraft door 10 is specifically adapted to substantially maintain contact or seal with a door frame 12.

In general, referring now to FIG. 1, the aircraft door 10 of the present invention is provided with a substantially rigid door panel or body 14. A door body flange 16 extends about the periphery of the door body 14 and is fixedly attached thereto. As further discussed below, the aircraft door 10 is provided with an elastic portion 18. The elastic portion 18 extends about the door panel flange 16 with the door body flange 16 interposed between the elastic portion 18 and the door body 14. The aircraft door 10 is additionally provided with a movable edge portion 20 which extends about the elastic portion 18. In this respect, the elastic portion 18 is interposed between the door body flange 16 and the edge portion 20. The elastic portion 18 is formed to contract and expand to facilitate movement of the edge portion 20 with respect the door body flange 16 and the attached door body 14. The edge portion 20 is sized and configured to engage the door frame 12. The edge portion 20 has a sealed position with the edge portion 20 being engaged with the door frame 12. The edge portion 20 further has an unsealed position with the edge portion 20 being spaced from the door frame 12. The elastic portion 18 is selectively expandable and compressible for permitting movement of the edge portion 20 between the sealed and unsealed positions.

In this regard, the aircraft door 10 of FIG. 1 is depicted is shown in a closed position and the edge portion 20 thereof is in an unsealed position. Furthermore, the elastic portion 18 is shown in a contracted or compressed state. As such, a discontinuity or gap 22 extends between the edge portion 20 and the door frame 12.

Importantly, as shown in FIGS. 3–6, the aircraft door 10 is further provided with an actuator device 24 which mechanically couples the door body 14 with the edge portion 20 for selectively moving the edge portion 20 between the sealed and unsealed portions. The actuator device 24 comprises a shape memory metal material having a predetermined transition temperature. The actuator device 24 assumes a contracted state when above the transition temperature and the edge portion 20 is sized and configured to be in the unsealed position. The actuator device assumes an expanded state when below the transition temperature and the edge portion 20 is sized and configured to be in the sealed position.

In general, the aircraft door 10 is sized and configured to have any geometry required to span the associated area defined by the door frame 12, and thus may be rectangular, circular, planar, arcuate or have any other geometry. As such, the present invention may be practiced with any number of door/door frame geometry configurations. As depicted in FIG. 1, the aircraft door 10 is depicted to be geometric in shape having six sides. In this respect, the aircraft door 10 depicted in FIG. 1 is symbolic of any geometry. Characteristically, the aircraft door 10 is configured to have open and closed positions. It is contemplated that the edge portion 20 may only assume a sealed position with respect to the door frame 12 when the aircraft door 10 is in the closed position. As such, the actuator device 24 will typically only be activated when the door is in the closed position. The apparatus and methods for facilitating the opening and closing of the aircraft door 10 are chosen from those which are well known to one of ordinary skill in the art. For example, the aircraft door 10 may include hinge devices for rotating the door 10 with respect to the door frame 12 into and out of the open and closed positions. Alternatively, the aircraft door 10 may be releasably attachable to the door frame 12 and thus may take the form of a removable cover.

The edge portion 20 need not be a continuous member. Preferably, the edge portion 20 is formed of multiple edge segments 26. Thus, the symbolically representative aircraft door 10 of FIG. 1 is depicted to include an edge portion 20 having twelve edge segments 26 (individually denoted 26a–l). The individual edge segments 26 may have various shapes which are defined by the specific geometry of the associated aircraft door 10 and door frame 12. As shown, the edge segments 24a–f are substantially straight, while the other edge segments 26g–l are angular and generally define the corners of the aircraft door 10. It is contemplated that such segmenting of the edge portion 20 facilitates independent directional movement of the various edge segments 26. In this regard, for example, edge segment 26a is configured to move in an opposing direction from that the edge segment 26d. Those of ordinary skill in the art will recognize that a greater or fewer number of edge segments 26 may be included in the edge portion 20. In a similar regard, it is contemplated that the elastic portion 18 may be segmented.

The edge portion 20, collectively defined by the edge segments 24, is provided with a contact surface 28. The contact surface is adapted to sealably engage the door frame 12. In this respect, formed within the door frame 12 is a door frame mating flange 30 having a configuration complementary to that of the contact surface 28. As will be recognized, the receipt of the contact surface 28 of the edge portion 20 into the door frame mating flange 30 is adapted to create a seal between the aircraft door 10 and the door frame 12. It is contemplated that actual contact is not necessary in order for the edge portion 20 to seal with the door frame mating flange 30, but rather the edge portion 20 need only come in close proximity to the door frame mating flange 30. It is preferable, however, that the edge portion 20 seals with the door frame mating flange 20 via substantial positive outward pressure contact therewith. Such positive pressure contact operates to substantially maintain contact between the edge portion 20 and the door frame 12 despite any changes in the geometry of the door frame 12. Thus, a perimeter door gap 22 or formation thereof can be mitigated or otherwise reduced.

Those of ordinary skill in the art will recognize that though the contact surface 30 of the edge portion 20 is configured to be captured within the door frame mating flange 30, alternative configurations may be chosen from those which are well known to one of ordinary skill in the art. In this respect, an O-ring 32 is preferably provided which is disposed about the door frame mating flange 30. The edge portion 20 is configured to received the O-ring 32 for enhanced sealing thereat and may thus have an O-ring seat 34 formed therein.

As mentioned above, the elastic portion 18 is selectively expandable and contractible for permitting the independent movement of each of the edge segments 24 relative to the door frame 12 when the aircraft door 10 is in a closed position. Expansion and contraction of the elastic portion 18 results in the movement of each of the edge segments 26 along a respective axis of motion. As will be recognized, the elastic portion 16 is necessarily fabricated from a flexible material, and is preferably formed from an elastomeric material, such as silicone or urethane, though similar alternative materials may also be employed in relation thereto. In the preferred embodiment of the present invention, the elastic portion 18 is formed of a material which is characterized as having a substantially low or zero Poisson ratio within the range of the anticipated contractive/expansive elastic portion movement. It is contemplated that a substantially low or zero Poisson ratio material will mitigate deformations of the elastic portion 18 in directions other than or transverse to a plane defined by the movement of the edge portion 20, and in particular the individual edge segments 26 thereof. Thus, undesirably out-of-plane buckling may be substantially mitigated. As such, a silicon foam material is contemplated to be preferably utilized to fabricate the elastic portion 18. Additionally, it is contemplated, though not required, that the edge segments 26 will be formed of a material which is substantially more rigid than that used to form the elastic portion 18.

The actuator device 24 comprises a shape memory metal material having a predetermined transition temperature. It is contemplated that shape memory metals are generally known in the art. Such metals are characterized by transition temperature, such as 90° C. for example. When the shape memory material is exposed to and assumes a temperature which is above the transition temperature, the metal tends to contract or shrink. When the shape memory material is exposed to and assumes a temperature which is below the transition temperature, the metal tends to expand.

Figure 5:
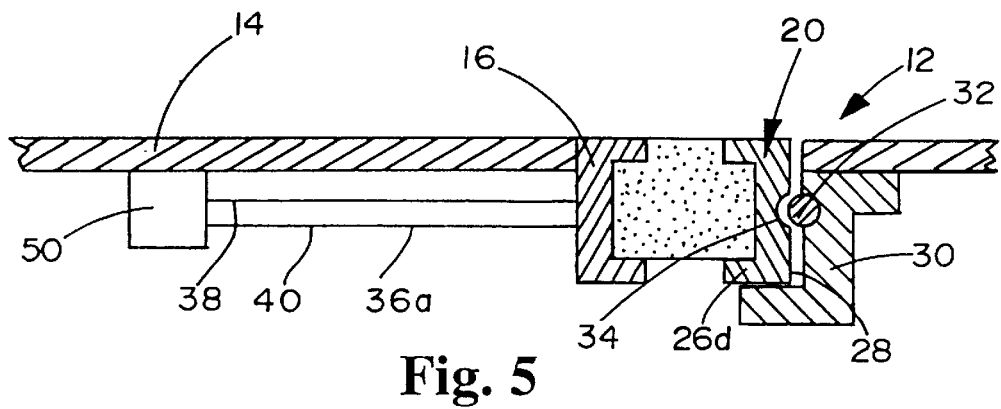
FIG. 5 is an enlarged cross-sectional view of the section of the aircraft door illustrated in FIG. 2 shown in a sealed position.

The actuator device 24 is configured to assume a contracted state when above the transition temperature. When the actuator device 24 is in such contracted state, the edge portion 18 is cooperatively sized and configured to be in the unsealed position (as depicted in FIGS. 1–4 and 6). In addition, the actuator device 24 is configured to assume an expanded state when below the transition temperature. When the actuator device 24 is in such expanded state, the edge portion 18 is cooperatively sized and configured to be in the sealed position (as depicted in FIG. 5). As will be recognized, due to the placement of the edge segments 26 immediately adjacent the elastic portion 20, the outward movement of the edge segments 26 caused by the actuator device 24 will result in the expansion or stretching of the elastic portion 20. Conversely, the inward movement of the edge segments 26 by the actuator device 24 will result in the contraction or compression of the elastic portion 20.

Figure 6:
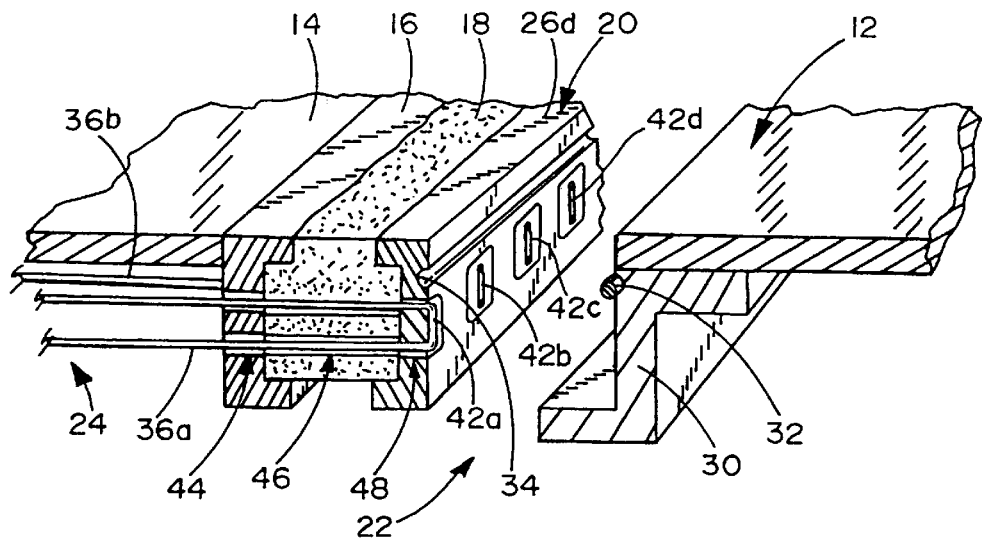
FIG. 6 is a perspective view of the section of aircraft door of FIGS. 2–4.

In the preferred embodiment of the present invention, the actuator device 24 is provided with an array of shape memory metal wires 36 to collectively move the edge segments 26, and hence the edge portion 20 between the sealed and unsealed portions. The shape memory metal wires 36 may vary in size, geometry and cross-sectional shape, and the wires 36 preferably have a circular cross-section having a diameter of about 0.01 inches. Each of the shape memory metal wires 36 has first and second ends 38, 40 and a wire body 42 interposed between the first and second ends 38, 40. The shape memory metal wires 36 are sized and configured to impart a motive force against the edge portion 20, and more particularly the edge segments 26 thereof. The wire body 42 of each of the shape memory metal wires 36 may be looped about the edge segments 26 (as depicted in FIG. 6). The shape memory metal wires 36 are preferably disposed in slidable communication with the door body flange 16, the elastic portion 18 and the edge segments 26. In this respect oversized holes 44, 46, 48 may be respectively formed in the door body flange 16, the elastic portion 18 and the edge segments 26.

The actuator device 24 may be adapted to actuate movement of the edge segments 26 individually or in any desired combination, including the simultaneous movement of all of the edge segments 26. The actuator device 24 may be cause movement of the edge segments 26 in response to sensed conditions regarding the geometry of the door frame 12, as well as the aircraft door 10 itself. Such sensed conditions may include the aircraft door 10 being opened/closed, and the deformation of the door frame 12 which may cause the formation of a gap 22 thereat. In addition, the actuator device 24, and more particularly, the shape memory wires 36 thereof, is preferably pre-strained to compress the elastic portion 18 when the actuator device 24 is fully actuated, i.e., the edge segments 26 are substantially sealed with the door frame 12. A pre-strain of approximately 2% is desirable. Such a pre-strain is contemplated to account for any undesirable deformation of the various sub-components as a result of prolonged use or wear.

The actuator device 24 further comprises a heat source 50 in thermal communication with the shape memory metal wires 36 for selectively heating the shape memory wires 36 above and below the transition temperature. The heat source 50 preferably takes the form of a plurality of thermal strips, each of which respectively correspond to a respective one of the edge segments 26. The first and second ends 38, 40 of the shape memory wires 36 are thermally connected to the heat source 50. The heat source 50 may be selected from those which are well known to one or ordinary skill in the art. It is contemplated that such a selection may be influence by variables such as size, weight, thermal output and thermal output rate of the heat source. It is contemplated that the heat source 50 and attached wires 36 will be sufficiently insulated from undesirable exposure to temperature differentials occurring adjacent thereto.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. An aircraft door adapted to substantially seal with a door frame, the aircraft door comprising:
    an edge portion formed to be engagable with the door frame, the edge portion having a sealed position wherein the edge portion is engagable with the door frame, the edge portion having an unsealed position wherein the edge portion is not engagable with the door frame;
    a substantially rigid door body;
    an elastic portion interposed between the door body and the edge portion, the elastic portion being selectively expandable and compressible for permitting movement of the edge portion between the sealed and unsealed portions;
    an actuator device mechanically coupling the door body with a the edge portion for selectively moving the edge portion between the sealed and unsealed positions, the actuator device comprising a shape memory metal material having a predetermined transition temperature;
    wherein the actuator device assuming a contracted state when above the transition temperature and the edge portion being sized and configured to be in the unsealed position; and
    wherein the actuator device assuming an expanded state when below the transition temperature and the edge porting being sized and configured to be in the sealed position.

2. The aircraft door of claim 1 wherein the actuator device comprises a shape memory metal wire.

3. The aircraft door of claim 2 wherein the actuator device further comprises a heat source in thermal communication with the shape memory metal wire for selectively heating the shape memory wire above and below the transition temperature.

4. The aircraft door of claim 3 wherein the heat source comprises a thermal strip.

5. The aircraft door of claim 3 wherein the shape memory metal wire having first and second ends in thermal communication with the heat source.

6. The aircraft door of claim 5 wherein the shape memory metal wire having a wire body interposed between the first and second ends, the wire body being looped about the edge portion.

7. The aircraft door of claim 2 wherein the shape memory wire having a diameter of about 0.01 inches.

8. The aircraft door of claim 2 wherein the shape memory wire being in slidable communication with the elastic portion.

9. The aircraft door of claim 2 wherein the shape memory wire being in slidable communication with the edge portion.

10. The aircraft door of claim 1 wherein the actuator device comprises a plurality of shape memory metal wires arrayed to collectively move the edge portion between the sealed and unsealed positions.

11. The aircraft door of claim 1 wherein the actuator device being pre-strained to compress the elastic material when the actuator device is at the transition temperature.

12. The aircraft door of claim 1 wherein the elastic portion comprises a silicone material.

13. The aircraft door of claim 12 wherein the elastic portion comprises a foam material.

14. The aircraft door of claim 1 wherein the elastic portion having a substantially zero poisson ratio.

15. The aircraft door of claim 1 wherein the edge portion comprises multiple edge segments.

16. An aircraft door adapted to substantially seal with a door frame, the aircraft door comprising:
    an edge portion formed to be engagable with the door frame, the edge portion having a sealed position wherein the edge portion is engagable with a the door frame, the edge portion having an unsealed position wherein the edge portion is not engagable with the door frame;
    a substantially rigid door body;
    an elastic portion interposed between the door body and the edge portion, the elastic portion being selectively expandable and compressible for permitting movement of the edge portion between the sealed and unsealed positions;
    an actuator device mechanically coupling the door body with the edge portion for selectively moving the edge portion between the sealed and unsealed positions, the actuator device comprising a shape memory metal wire having a predetermined transition temperature;
    wherein the shape memory metal wire assuming a contracted state when above the transition temperature and the edge portion being sized and configured to be in the unsealed position; and
    wherein the shape memory metal wire assuming an expanded state when below the transition temperature and the edge portion being sized and configured to be in the sealed position.

17. The aircraft door of claim 16 wherein the actuator device further comprises a heat source in thermal communication with the shape memory metal wire for selectively heating the shape memory wire above and below the transition temperature.

18. The aircraft door of claim 17 wherein the heat source comprises a thermal strip.

19. The aircraft door of claim 17 wherein the shape memory metal wire having first and second ends in thermal communication with the heat source.

20. The aircraft door of claim 19 wherein the shape memory metal wire having a wire body interposed between the first and second ends, the wire body being looped about the edge portion.

21. An aircraft door adapted to substantially seal with a door frame, the aircraft door comprising:
    an edge portion formed to be engagable with the door frame, the edge portion having a sealed position wherein the edge portion is engaged with the door frame, the edge portion having an unsealed position wherein the edge portion is not engaged with the door frame;
    a substantially rigid door body; and
    an actuator device comprising a shape memory metal material mechanically coupling the edge portion to the door body and selectively moving the edge portion between the sealed and unsealed positions at a predetermined transition temperature of the material.

22. The aircraft door of claim 21 further comprises an elastic portion interposed between the door body and the edge portion, the elastic portion is selectively expandable and compressible for permitting movement of the edge portion between the sealed and unsealed positions.

23. The aircraft door of claim 22 wherein the elastic portion comprises a silicone material.

24. The aircraft door of claim 22 wherein the elastic portion comprises a foam material.

25. The aircraft door of claim 22 wherein the elastic portion having a substantially zero poisson ratio.

26. The aircraft door of claim 22 wherein the shape memory material is in slidable communication with the elastic portion.

27. The aircraft door of claim 22 wherein the actuator device is pre-strained to compress the elastic material when the actuator device is at the transition temperature.

28. The aircraft door of claim 21 wherein the actuator device assumes a contracted state when above the transition temperature and the edge portion is sized and configured to be in the unsealed position, the actuator device assumes an expanded state when below the transition temperature and the edge portion is sized and configured to be in the sealed position.

29. The aircraft door of claim 21 wherein the actuator device further comprises a heat source in thermal communication with the shape memory metal wire for selectively heating the shape memory wire above and below the transition temperature.

30. The aircraft door of claim 29 wherein the heat source comprises a thermal strip.

31. The aircraft door of claim 29 wherein the shape memory metal material has first and second ends in thermal communication with the heat source.

32. The aircraft door of claim 21 wherein the shape memory metal material comprises a shape memory metal wire.

33. The aircraft door of claim 32 wherein the shape memory metal wire has a wire body interposed between the first and second ends, the wire body is looped about the edge portion.

34. The aircraft door of claim 32 wherein the shape memory metal wire has a diameter of about 0.01 inches.

35. The aircraft door of claim 21 wherein the shape memory metal material is in slidable communication with the edge portion.

36. The aircraft door of claim 21 wherein the actuator device comprises a plurality of shape memory metal wires arrayed to collectively move the edge portion between the sealed and unsealed positions.

37. The aircraft door of claim 21 wherein the edge portion comprises multiple edge segments.

* * * * *